US009084121B2

(12) United States Patent
Wu et al.

(10) Patent No.: US 9,084,121 B2
(45) Date of Patent: Jul. 14, 2015

(54) RADIO SYSTEM AND OPERATING METHOD OF THE SAME

(75) Inventors: Sau-Hsuan Wu, New Taipei (TW); Chun-Hsien Ko, Taipei (TW)

(73) Assignee: NATIONAL CHIAO TUNG UNIVERSITY, Hsinchu (TW)

(*) Notice: Subject to any disclaimer, the term of this patent is extended or adjusted under 35 U.S.C. 154(b) by 511 days.

(21) Appl. No.: 13/445,930

(22) Filed: Apr. 13, 2012

(65) Prior Publication Data

US 2013/0273959 A1 Oct. 17, 2013

(51) Int. Cl.
| H04W 72/00 | (2009.01) |
| H04B 7/00 | (2006.01) |
| H04W 24/00 | (2009.01) |
| H04W 48/00 | (2009.01) |
| H04W 88/14 | (2009.01) |
| H04W 16/14 | (2009.01) |
| H04W 24/10 | (2009.01) |

(52) U.S. Cl.
CPC ............. *H04W 24/00* (2013.01); *H04W 16/14* (2013.01); *H04W 48/00* (2013.01); *H04W 88/14* (2013.01); *H04W 24/10* (2013.01)

(58) Field of Classification Search
CPC ..... H04W 16/14; H04W 24/00; H04W 24/10; H04W 48/00; H04W 88/14
USPC .......................................... 455/517, 464, 545
See application file for complete search history.

(56) References Cited

U.S. PATENT DOCUMENTS

| 2007/0159321 | A1* | 7/2007 | Ogata et al. | 340/539.12 |
| 2009/0247201 | A1* | 10/2009 | Ye et al. | 455/509 |
| 2010/0135214 | A1 | 6/2010 | Ishizu et al. | |
| 2010/0182928 | A1* | 7/2010 | Wu et al. | 370/252 |
| 2010/0330919 | A1 | 12/2010 | Gurney et al. | |
| 2011/0070885 | A1 | 3/2011 | Ruuska et al. | |
| 2011/0116453 | A1* | 5/2011 | Huang et al. | 370/329 |
| 2012/0135780 | A1* | 5/2012 | Sun et al. | 455/522 |

(Continued)

OTHER PUBLICATIONS

D.-H Juang, S-H Wu and P.-H Wang "Cooperative Spectrum Sensing and Locationing: A Sparse Bayesian Learning Approach" IEEE GlobeCom, Dec. 2010.
A.P. Iyer, K. Chintalapudi, V. Navda, R. Ramjee, V.N. padmanabhan and C.R. Murthy"Spectrum Sensing Sans Frontieres" Microsoft Research India.

(Continued)

*Primary Examiner* — Ping Hsieh
*Assistant Examiner* — Xin Jia
(74) *Attorney, Agent, or Firm* — CKC & Partners Co., Ltd.

(57) ABSTRACT

A radio system is provided. The radio system comprises primary devices, secondary devices, cognitive radio base stations and a data fusion center. The primary devices are licensed to use communication channels. The secondary devices acquire sensing reports of received signal strength, location and channel information of the primary devices. The cognitive radio base stations receive the sensing reports generated by the secondary devices through a control channel. The data fusion center receives the sensing reports from the cognitive radio base stations through a backbone network and performs a cooperative spectrum sensing process on the sensing reports to obtain primary device information with respect to the number, spectrum distribution and coverage area of the primary devices, wherein the primary device information is accessible by the secondary devices such that the secondary devices select one of the communication channels according to the primary device information to perform communications.

14 Claims, 3 Drawing Sheets

(56) References Cited

U.S. PATENT DOCUMENTS

2012/0302275 A1* 11/2012 Junell et al. .................. 455/514
2014/0029585 A1* 1/2014 Freda et al. .................. 370/336

OTHER PUBLICATIONS

J. Dean and S. Ghemawat, "MapReduce: Simplified Data Processing on Large Clusters," Communications of the ACM, vol. 51, No. 1, pp. 107-113, Jan. 2008.

* cited by examiner

RADIO SYSTEM AND OPERATING METHOD OF THE SAME

BACKGROUND

1. Technical Field

The present disclosure relates to a communication technology. More particularly, the present disclosure relates to a radio system and an operating method of the same

2. Description of Related Art

Cognitive radio (CR) has been proposed as a way to improve the current inefficient static spectrum utilization by allowing secondary users to access the white spaces in spectrum already licensed to primary users without interfering the operation of the primary users. Hence, the spectral efficiency of the limited spectrum can be increased.

Spectrum sensing can be employed to determine available spectrum over large areas by cooperatively aggregating spectrum sensing results across multiple detector locations to facilitate determinations relevant to the area covered by the signals of primary users. In other words, a reliable system is needed to allow the detectors to detect the spectral region that is not being occupied by primary users and to integrate the spectral region information so that secondary users can make use of the spectrum without interfering with the operation of primary users.

Accordingly, there is a need to provide a radio system and an operating method of the same to address the above issues.

SUMMARY

An aspect of the present disclosure is to provide a radio system. The radio system comprises primary devices, secondary devices, cognitive radio base stations and a data fusion center. The primary devices are licensed to access the communication channels. The secondary devices acquire sensing reports of the received signal strength, locations and channel information of the primary devices. The cognitive radio base stations receive the sensing reports generated by the secondary devices through a control channel. The data fusion center receives the sensing reports from the cognitive radio base stations through a backbone network, and performs a cooperative spectrum sensing process on the sensing reports to obtain primary device information with respect to the number, locations, spectrum distribution and coverage area of the primary devices, wherein the primary device information is accessible by the secondary devices such that the secondary devices select one of the communication channels according to the primary device information to perform communications.

Another aspect of the present disclosure is to provide an operating method for a radio system. The operating method comprises the steps outlined below. Sensing reports of received signal strength, locations and channel information of primary devices are acquired by a plurality of secondary devices. The sensing reports generated by the secondary devices are received by a plurality of cognitive radio base stations through a control channel provided. The sensing reports from the cognitive radio base stations are received by a data fusion center through a backbone network such that a cooperative spectrum sensing process is performed on the sensing reports to obtain primary device information with respect to the number, locations, spectrum distribution and coverage area of the primary devices. The primary device information is accessible by the secondary devices such that the secondary devices select one of communication channels according to the primary device information to perform communications.

It is to be understood that both the foregoing general description and the following detailed description are by examples, and are intended to provide further explanation of the disclosure as claimed.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1:
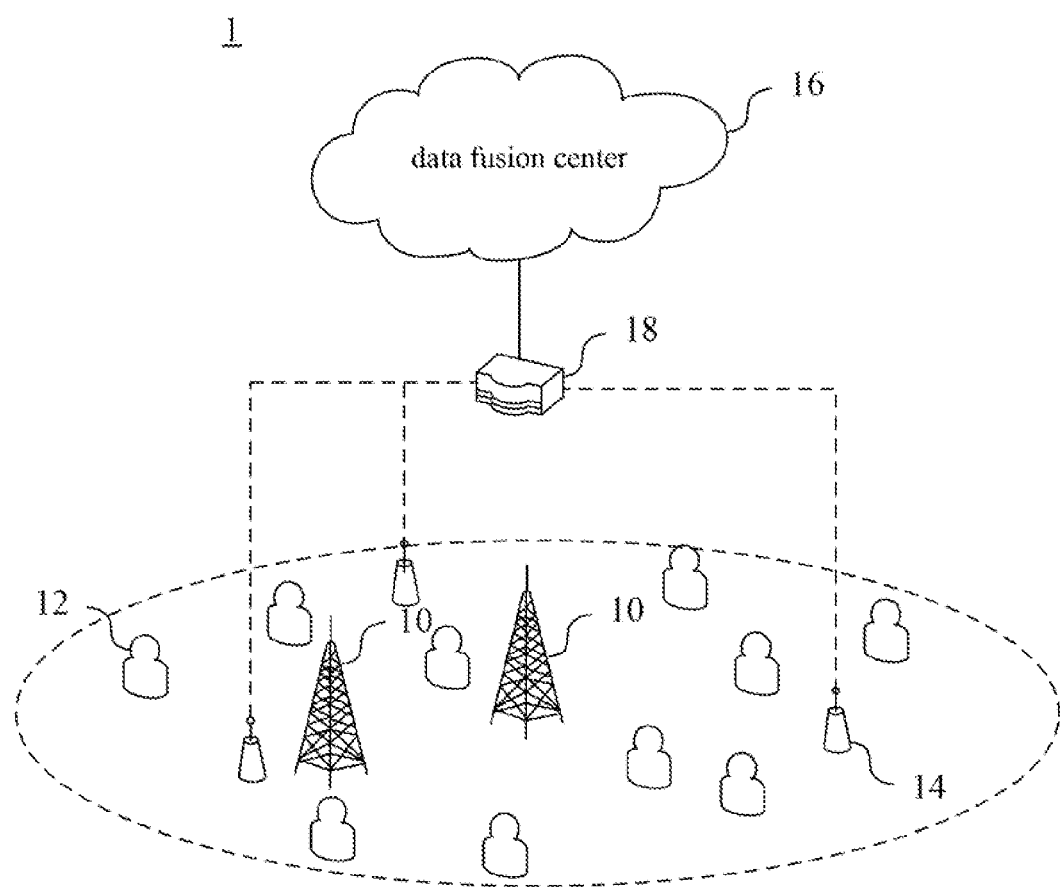
FIG. 1 is a diagram of a radio system in an embodiment of the present disclosure.

Reference will now be made in detail to the present embodiments of the disclosure, examples of which are illustrated in the accompanying drawings. Wherever possible, the same reference numbers are used in the drawings and the description to refer to the same or like parts.

FIG. 1 is a diagram of a radio system 1 in an embodiment of the present disclosure. The radio system 1 comprises primary devices 10, secondary devices 12, cognitive radio base stations 14 and a data fusion center 16.

The radio system 1 substantially comprises a hybrid network (not shown) having a primary radio network (not shown) corresponding to the primary devices 10 and a cognitive radio network (not shown) corresponding to the cognitive radio base stations 14. The two networks may coexist without being physically connected.

The primary radio network is comprised of primary devices 10 serving primary licensed users. The primary devices 10 provide a plurality of communication channels. The communication channels comprise a plurality of data channels for data transmission. In an embodiment, each of the primary devices 10 is a TV base station that is able to transmit TV signals through a very high frequency (VHF) band and an ultra high band (UHF). The VHF band and the UHF band comprise different channels for signal transmission.

The secondary devices 12 can acquire sensing reports of received signal strength (e.g. RSSI; Received Signal Strength Intensity), locations and channel information of the primary devices 10. In an embodiment, the sensing reports comprise the power of the primary devices 10 detected on the data channels and the locations of the secondary devices 12. The secondary devices 12 comprise wireless communication devices such as a Smartphone, a tablet personal computer or a desktop equipped with wireless communication units that may or may not be able to acquire sensing reports automatically. The secondary devices 12 can further comprise at least one sensing device that is disposed around the coverage area of the primary devices 10 for acquire sensing reports only.

The cognitive radio network is adaptive and comprises the cognitive radio base stations 14 serving the cognitive radio user devices, i.e. the secondary devices 12. The cognitive radio base stations 14 receive the sensing reports generated by the secondary devices 12. It is noted that in different embodiments, the cognitive radio base stations 14 can be disposed in different places to receive the sensing reports from the secondary devices 12 in various locations. It is also noted that both the secondary devices 12 and the cognitive radio base stations 14 are unauthorized users to the data channels of the primary devices 10. Accordingly, the secondary devices 12 and the cognitive radio base stations 14 are able to communicate with each other through a control channel that both of the secondary devices 12 and the cognitive radio base stations are authorized to access, wherein the control channel is different from the data channels. In an embodiment, the control channel is in the ISM (Industrial, Scientific and Medical) band.

The data fusion center 16 further receives the sensing reports from the cognitive radio base stations 14 through a backbone network. In an embodiment, the data fusion center 16 receives the sensing reports from the cognitive radio base stations 14 through a gateway device 18. The data fusion center 16 performs a cooperative spectrum sensing process on the sensing reports to obtain primary device information with respect to the number of primary devices, the locations, spectrum distribution and the coverage area of the primary devices 10.

Figure 2:
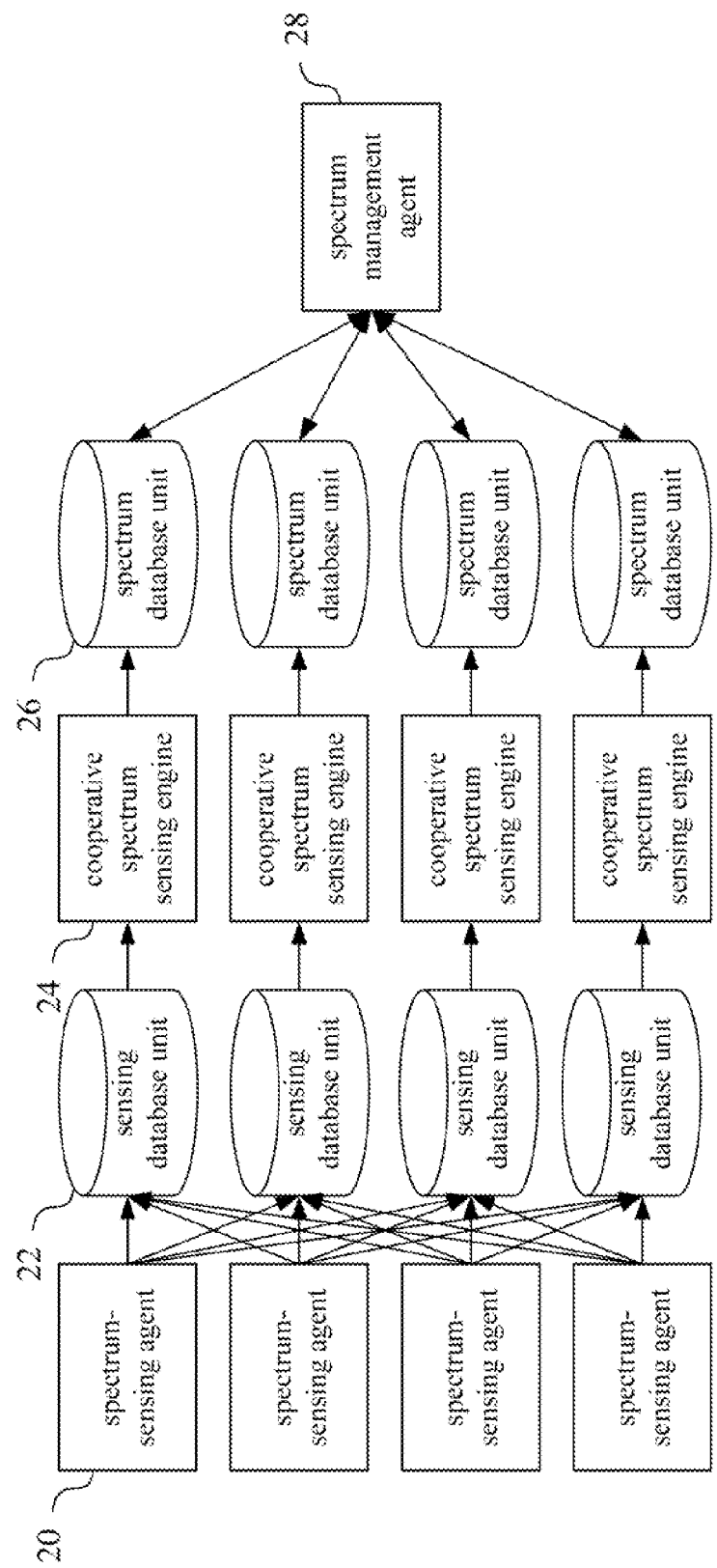
FIG. 2 is a diagram of a data fusion center depicted in FIG. 1 in an embodiment of the present disclosure.

FIG. 2 is a diagram of the data fusion center 16 depicted in FIG. 1 in an embodiment of the present disclosure. The data fusion center 16 comprises spectrum-sensing agents 20, sensing database units 22, cooperative spectrum sensing engines 24 and spectrum database units 26.

The spectrum-sensing agents 20 substantially receive the sensing results from the cognitive radio base stations 14 and sort the sensing results. In an embodiment, the spectrum-sensing agents 20 sort the sensing results by their corresponding locations and frequency bands and further transmit the sorted sensing results to the corresponding sensing database units 22. The sensing database units 22 establish a sensing result database according to the sorted sensing results. The sensing database units 22 can be established by using SQL Azure structure or other kinds of database systems. It is also noted that in some embodiments, the spectrum-sensing agents 20 may not be presented such that the sensing database units 22 can directly establish the sensing result database.

The cooperative spectrum sensing engines 24 are electrically coupled to the sensing database units 22 to perform a cooperative spectrum sensing process in parallel to the sensing results. In an embodiment, the cooperative spectrum sensing engines 24 may comprise a plurality of computing units to perform computation on the sensing results to obtain the primary device information.

In an embodiment, the primary device information comprises the number, powers, locations (e.g. latitudes and longitudes) and the channel conditions of the primary devices 10. In another embodiment, the primary device information further comprises the height and the radiation pattern of the antenna of the primary devices 10, the spectrum distribution, the coverage area and other related parameters of the primary devices 10 calculated from the sensing results. Sparse Bayesian Learning algorithm or other kinds of algorithm can be used to calculate the data described above to further obtain the primary device information. The cooperative spectrum sensing engines 24 further sort the primary device information and transmit the primary device information to the spectrum database units 26.

The spectrum database units 26 are electrically coupled to the cooperative sensing engines 24 to establish a spectrum database according to the sorted primary device information. In an embodiment, each of the spectrum database units 26 stores the primary device information corresponding to a specific region.

In an embodiment, the data fusion center 16 described above can be implemented by a cognitive radio cloud system and the computing units of the cooperative spectrum sensing engines 24 can be the virtual machines initialized by the host of the cooperative spectrum sensing engines 24.

Accordingly, the data fusion center 16 is able to establish a database related to the operation condition of the primary devices 10. The secondary devices 12 enable efficient use of the spectrum by opportunistically utilizing the vacancies of the band when they exist, which requires the need for an efficient spectrum sensing mechanism. The primary devices 10 can occupy and leave any vacant band at any time. Thus, in a given location, the spectrum occupancy is varying in time and the secondary devices 12 should not only be able to detect the vacant bands but also vacate them quickly when the primary devices 10 appear. Through the establishment of the spectrum database, the operation information of the primary devices 10 can be recorded in a real time manner. In an embodiment, the primary device information stored in the spectrum database is accessible by the secondary devices 12 such that the secondary devices 12 can select one of the communication channels that is available according to the primary device information to perform communications.

In an embodiment, the data fusion center 16 further comprises a spectrum management agent 28 electrically coupled to the spectrum database units 26. The spectrum management agent 28 is able to receive a channel access request generated by one of the secondary devices 12 through the cognitive radio base stations 14 and announce a channel policy according to the primary device information through a backbone network to the cognitive radio base station 14 by inquiring the spectrum database. In other embodiments, other policies can be used to access the spectrum database units 26. Accordingly, the secondary devices 14 can select one of the communication channels according to the channel policy to perform communications.

Consequently, the radio system 1 allows the secondary devices 12 to detect the vacant bands of the primary devices 10 by accessing the primary device information generated and stored in the data fusion center 16. The efficient use of the spectrum is thus enabled.

Figure 3:
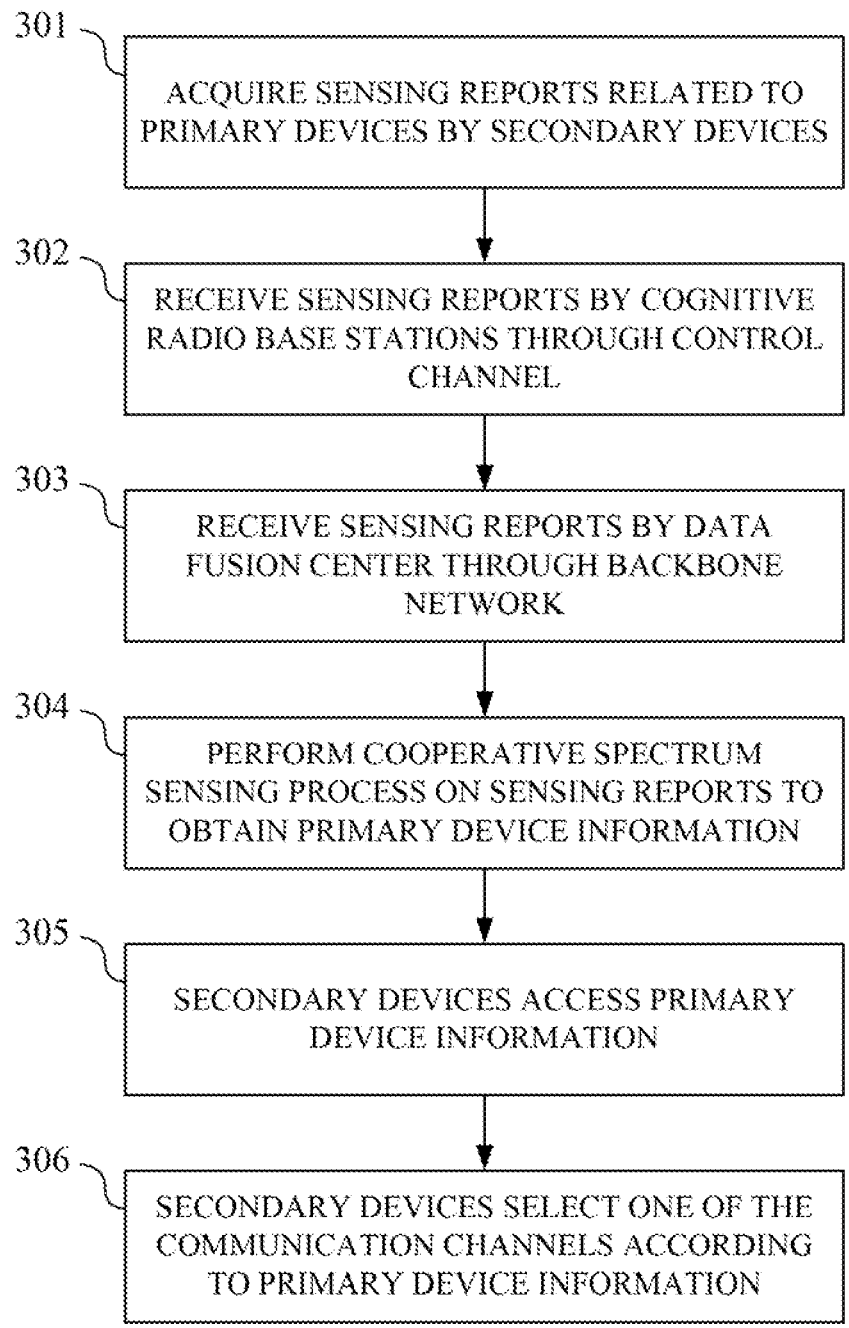
FIG. 3 is a flow chart showing an operating method for a radio system in an embodiment of the present disclosure.

FIG. 3 is a flow chart showing an operating method 300 for a radio system in an embodiment of the present disclosure. The operation method 300 can be used in the radio system 1 depicted in FIG. 1. The operating method 300 comprises the steps outlined below (The steps are not recited in the sequence in which the steps are performed. That is, unless the sequence of the steps is expressly indicated, the sequence of the steps is interchangeable, and all or part of the steps may be simultaneously, partially simultaneously, or sequentially performed).

In step 301, sensing reports related to the primary devices 10, such as the received signal strength, location and channel information of the primary devices 10 are acquired by the secondary devices 12.

In step 302, the sensing reports generated by the secondary devices 12 are received by the cognitive radio base stations 14 through the control channel provided.

In step 303, the sensing reports from the cognitive radio base stations 14 are received by the data fusion center 16 through a backbone network.

In step 304, a cooperative spectrum sensing process is performed on the sensing reports to obtain primary device information with respect to, the number, spectrum distribution and coverage area of the primary devices 10.

In step 305, the primary device information is accessed by the secondary devices 12.

In step 306, the secondary devices 12 select one of communication channels according to the primary device information to perform communications.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A radio system, comprising:
   a plurality of primary devices are licensed to access a plurality of communication channels, wherein the communication channels comprises a plurality of data channels for data transmission;
   a plurality of secondary devices for acquiring sensing reports of received signal strength, channel information of the primary devices and locations where the received signal strength are collected;
   a plurality of cognitive radio base stations for receiving the sensing reports generated by the secondary devices through a control channel, wherein the control channel is different from the data channels, and the secondary devices and the cognitive radio base stations are unauthorized users to the data channels; and
   a data fusion center for receiving the sensing reports from the cognitive radio base stations through a backbone network and for performing a cooperative spectrum sensing process on the sensing reports to obtain primary device information with respect to the number, locations, spectrum distribution and coverage area of the primary devices, wherein the primary device information is accessible by the secondary devices such that the secondary devices select one of the communication channels according to the primary device information to perform communications;
   wherein all processing of the sensing reports of the received signal strength and channel information of the primary devices and locations where the received signal strength are collected is performed by the data fusion center, and the secondary devices only acquires the sensing reports of the primary devices; and
   wherein the receiving signal strength of the primary devices for which the secondary devices acquire sensing reports is a measurement of a power present in a signal strength received by the secondary devices.

2. The radio system of claim 1, wherein the data fusion center is a cognitive radio cloud system.

3. The radio system of claim 1, wherein the data fusion center comprises:
   a plurality of sensing database units for receiving the sensing results from the cognitive radio base stations and for establishing the sensing result database;
   a plurality of cooperative spectrum sensing engines electrically coupled to the sensing database units to perform the cooperative spectrum sensing process in parallel to the sensing results to obtain the primary device information and further sort the primary device information; and
   a plurality of spectrum database units electrically coupled to the cooperative sensing engines to establish a spectrum database according to the sorted primary device information.

4. The radio system of claim 3, wherein the data fusion center further comprises a spectrum-sensing agent for substantially receiving the sensing results from the cognitive radio base station and for sorting the sensing results according to corresponding locations and frequency bands, wherein the sensing database units receive the sorted sensing results and establish the sensing result database according to the sorted sensing results.

5. The radio system of claim 3, wherein the cognitive radio base stations further receive channel access requests generated by one or many of the secondary devices.

6. The radio system of claim 5, wherein a data fusion center further comprises:
   a spectrum management agent electrically coupled to the spectrum database units to announce a channel policy according to the primary device information through the backbone network to the cognitive radio base stations by inquiring the spectrum database such that the secondary devices select one of the communication channels according to the channel policy to perform communications.

7. The radio system of claim 3, wherein the cooperative spectrum sensing engines comprise a plurality of computing units.

8. The radio system of claim 7, wherein the computing units are a plurality of virtual machines initialized by at least one host.

9. The radio system of claim 1, wherein the secondary devices comprise a plurality of sensing devices for acquiring the sensing reports only.

10. An operating method for a radio system, comprising:
    acquiring sensing reports of received signal strength, channel information of a plurality of primary devices and locations where the received signal strength are collected by a plurality of secondary devices, wherein the primary devices are licensed to access a plurality of communication channels, wherein the communication channels comprises a plurality of data channels for data transmission;
    receiving the sensing reports generated by the secondary devices through a control channel provided by cognitive radio base stations, wherein the control channel is different from the data channels, and the secondary devices and the cognitive radio base stations are unauthorized users to the data channels; and
    receiving the sensing reports from the cognitive radio base stations through a backbone network by a data fusion center such that a cooperative spectrum sensing process is performed on the sensing reports to obtain primary device information with respect to the number, locations, spectrum distribution and coverage area of the primary devices;
    wherein the primary device information is accessible by the secondary devices such that the secondary devices select one of communication channels according to the primary device information to perform communications;
    wherein all processing of the sensing reports of the received signal strength and channel information of the primary devices and locations where the received signal strength are collected is performed by the data fusion center, and the secondary devices only acquires the sensing reports of the primary devices; and
    wherein the receiving signal strength of the primary devices for which the secondary devices acquire sensing reports is a measurement of a power present in a signal strength received by the secondary devices.

11. The operating method of claim 10, wherein the step of obtaining the primary device information further comprises:
    sorting the primary device information; and
    establishing a spectrum database.

12. The operating method of claim 10, wherein the step of receiving the sensing reports from the cognitive radio base stations through the backbone network by the data fusion center further comprising sorting the sensing reports to establish a sensing result database such that the cooperative spectrum sensing process is performed on the sorted sensing reports.

13. The operating method of claim 10, further comprising:
receiving a channel access request generated by one of the secondary devices by the cognitive radio base station.

14. The operating method of claim 10, further comprising:
announcing a channel policy according to the primary device information through the backbone network to the cognitive radio base stations by inquiring the spectrum database such that the secondary devices select one of the communication channels according to the channel policy to perform communication.

* * * * *